US009147113B2

(12) United States Patent
Chow

(10) Patent No.: US 9,147,113 B2
(45) Date of Patent: Sep. 29, 2015

(54) DEFORMABLE SURFACE TRACKING IN AUGMENTED REALITY APPLICATIONS

(71) Applicant: Hong Kong Applied Science and Technology Research Institute Company Limited, Hong Kong (HK)

(72) Inventor: Felix Chow, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 87 days.

(21) Appl. No.: 14/047,039

(22) Filed: Oct. 7, 2013

(65) Prior Publication Data

US 2015/0098607 A1   Apr. 9, 2015

(51) Int. Cl.
G06K 9/00    (2006.01)
G06K 9/62    (2006.01)

(52) U.S. Cl.
CPC .......... G06K 9/00758 (2013.01); G06K 9/6212 (2013.01)

(58) Field of Classification Search
None
See application file for complete search history.

(56) References Cited

U.S. PATENT DOCUMENTS

| | | | |
|---|---|---|---|
| 6,754,278 B1 * | 6/2004 | Suh et al. | 375/240.27 |
| 6,865,227 B2 * | 3/2005 | Chan | 375/240.16 |
| 8,705,845 B2 * | 4/2014 | Doucet et al. | 382/154 |
| 8,811,754 B2 * | 8/2014 | Conger | 382/225 |
| 2003/0152285 A1 * | 8/2003 | Feldmann et al. | 382/274 |
| 2010/0067806 A1 * | 3/2010 | Shutt | 382/217 |
| 2011/0085705 A1 * | 4/2011 | Izadi et al. | 382/103 |
| 2012/0092329 A1 * | 4/2012 | Koo et al. | 345/419 |
| 2014/0049560 A1 * | 2/2014 | Campbell et al. | 345/633 |

OTHER PUBLICATIONS

D Bradley, G Roth, and P Bose, "Augmented reality on cloth with realistic illumination," Machine Vision and Applications (2009) 20:85-92.*

* cited by examiner

*Primary Examiner* — Matthew Bella
*Assistant Examiner* — Soo Shin
(74) *Attorney, Agent, or Firm* — Ella Cheong Hong Kong; Sam T. Yip

(57) ABSTRACT

A computer implemented method for tracking a marker on a deformable surface in augmented reality (AR) applications, comprising: detecting image-key-points in a currently processed video frame of a video-captured scene; performing key-point-correspondence searching and matching the image-key-points with model-key-points are identified from an original image of the marker, comprising: calculating an key-point matching score for each image-key-point; applying a key-point matching score filter on the key-point matching scores; restricting the searching of the image-key-points in the currently processed video frame to within same mesh block determined in a previously processed video frame of the captured video frames; and applying adaptive thresholds on the key-point matching scores in determining successful matches of the image-key-points; performing motion detection of the marker in the video-captured scene and halting the application of the key-point matching score filter and suspending the restriction on the image-key-point searching if the marker is in significant movement.

8 Claims, 4 Drawing Sheets

DEFORMABLE SURFACE TRACKING IN AUGMENTED REALITY APPLICATIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the tracking of a marker in augmented reality (AR) applications. In particular, the present invention relates to the tracking of a flexible or deformable marker in real life AR applications.

BACKGROUND

Augmented reality (AR) is a technology combining virtual objects and/or information with perceptions of the physical real-world environment through the use of sensors, computer-generated data, and/or multimedia playback devices in order to enhance the users' perception of the physical real-world environment. For example, a camera can be used to video-capture a scene and a display unit such as video display glasses or goggles is used to project a computer-processed view of the scene to the viewer. Different from virtual reality where the viewer is presented a total artificial computer-generated viewing experience, only certain computer-generated imagery or virtual object is superimposed into the computer-processed view of the scene. The computer-generated imagery or virtual object can be viewer-interactive or driven by real-time user control or pre-configured settings and instructions.

One key measure of the AR technique is how realistic the resulting augmented video as perceived, or how well the integration of the computer-generated imageries or virtual objects with the view of the scene. This requires the correct association of the computer-generated imageries or virtual objects and their placement locations within the scene throughout a motion sequence or consecutive video frames of the scene. One common issue among existing AR techniques is the tracking of three-dimensional coordinates and orientations of two-dimensional planar markers for placements of virtual objects within a video-captured scene. The tracking of markers allows the virtual objects to be superimposed into the scene at the marker locations and orientations through the motion sequence of the scene.

However, the current state of the art does not have a satisfactory technique for addressing the situation in which a tracking marker for virtual object is placed on a deformable surface in a video-captured scene. A deformable surface can be found on a soft article such as a shirt on a person in motion, a flying flag, or moving water surface. A virtual object superimposed on a deformable surface not only need to properly appear at the right position in the right orientation during a motion sequence, its texture and shape must change along with the distortions of the deformable surface.

SUMMARY

It is an objective of the presently claimed invention to provide a method of marker tracking in augmented reality (AR) applications, wherein the marker is placed on a deformable surface. It is a further objective of the presently claimed invention to provide such marker tracking method characterized by improved marker tracking stability, marker key-point matching accuracy, reduced marker texture stickiness, and better marker key-point matching under background lighting and video noise fluctuations.

In accordance to various embodiments of the presently claimed invention, to track a marker placed on a deformable surface, polygon meshes are generated for the marker in a video-captured scene. The polygon meshes are for tracking the markers' three-dimensional positions and orientations, and three-dimensional deformations throughout the motion sequence (or video frames) of the video-captured scene.

In the generation of the polygon meshes of the marker in the video-captured scene, original key-points of the marker image are first identified. A key-point can be a sharp pictorial feature such as a corner, an edge, or an interest point of an object in the marker image. In various embodiments, key-points are detected using existing edge/corner/interest point detection or feature detection techniques in the art. Then in each of the subsequent video frames of the video-captured scene, the same key-points are to be searched and matched with the original key-points in a key-point-corresponding matching process.

In the key-point-corresponding matching process, key-point matching scores are calculated, indicating how closely matched of the candidate key-points found in the subsequent video frames to the original key-points of the marker image. A match is considered successful only if the matching score of a candidate key-point found in a currently processed video frame is above a pre-determined matching threshold. Finally, the information of the successfully matched key-points in the currently processed video frame and the polygon mesh of the original image of the marker or the image of the marker in the first video frame are used to generate the recovered polygon mesh of the marker in the currently processed video frame. As such, the recovered polygon mesh reflects the changes in the three-dimensional position and orientation, and three-dimensional deformation of the marker in the currently processed video frame from the previous video frame in the video-captured scene. A marker placed on a deformable surface, therefore, is tracked by a series of recovered polygon meshes generated for a series of video frames.

In accordance to one embodiment of the presently claimed invention, the aforementioned generation of the polygon meshes for the marker is enhanced in terms of key-point matching accuracy and marker tracking stability by incorporating an application of a key-point matching score filter; a restriction on candidate key-point searches in the currently processed video frame to within the same mesh block as in the previously processed video frame; an application of an adaptive threshold in determining successful matches of candidate key-points; and a motion detection of the marker in video-captured scene.

The application of a key-point matching score filter is to reduce video-noise induced jitters in key-point matching score calculation. When the key-point matching scores of a particular key-point are calculated for across multiple video frames, occasionally sharp negative spikes are found. Experiments reveal that these negative spikes in the inter-frame key-point matching scores are likely caused by video noise rather than actual mismatching or poor matching of candidate key-points. A key-point matching score filter is applied to smoothen the inter-frame key-point matching scores. In one embodiment, the negative spikes are replaced by a weighted average or a moving average of inter-frame key-point matching scores. In another embodiment, the negative spikes are replaced by their preceding scores.

The block of pixels in the video frame where the recovered polygon mesh is located is called the mesh block. Sometimes, false key-points are found outside of the mesh block due to video noise or other video effects, which cannot possibly be valid key-points of the marker. The mesh block key-point search restriction on candidate key-point searches is to limit key-point searching and matching in the currently processed video frame to within the same mesh block as in the previously processed video frame. As such, performance and accuracy are improved.

Fluctuation in background lighting and video noise throughout the motion sequence of the video-captured scene can cause pixel characteristics, such as color and intensity gradient, to change from one video frame to another. In turn the same key-point that is found and correctly matched in different video frames with different background lighting and/or video noise can have significantly different key-point matching scores for the different video frames. A fixed threshold used in determining successful matches for all video frames will inevitably cause incorrect determination of failed matches of valid key-points. As such, an embodiment of the presently claimed invention uses an adaptive threshold in determining successful matches of found key-points throughout the video frames to accommodate the changing background lighting and/or video noise. In one embodiment, the adaptive threshold is a discounted moving average of the inter-frame key-point matching scores or a moving average of inter-frame key-point matching scores less a buffer value.

As the marker's position changes through a motion sequence, the mesh block key-point search restriction could cause missed finding valid key-points that are located outside of the mesh block in the currently processed video frame when the marker has moved substantially from the previously processed video frame. At the same time, the key-point matching score calculation must also be more sensitive to found key-points that do not match with the original key-points of the marker image. Therefore, when the marker is moving substantially, the mesh block key-point search restriction is suspended temporarily and the application of key-point matching score filter is also halted temporarily.

In one embodiment, motion vectors are computed by using vertices of the recovered polygon mesh from the previously processed video frame and vertices of the recovered polygon mesh from the currently processed video frame. If the motion vectors are greater than a pre-determined marker movement threshold, the mesh block key-point search restriction is suspended and the application of key-point matching score filter is also halted for the next video frame to be processed until the motion vectors, that are continuously being computed, are no longer greater than the pre-determined marker movement threshold.

BRIEF DESCRIPTION OF THE DRAWINGS

Embodiments of the invention are described in more detail hereinafter with reference to the drawings, in which.

DETAILED DESCRIPTION

In the following description, methods and systems of tracking markers on deformable surface used in augmented reality (AR) applications and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
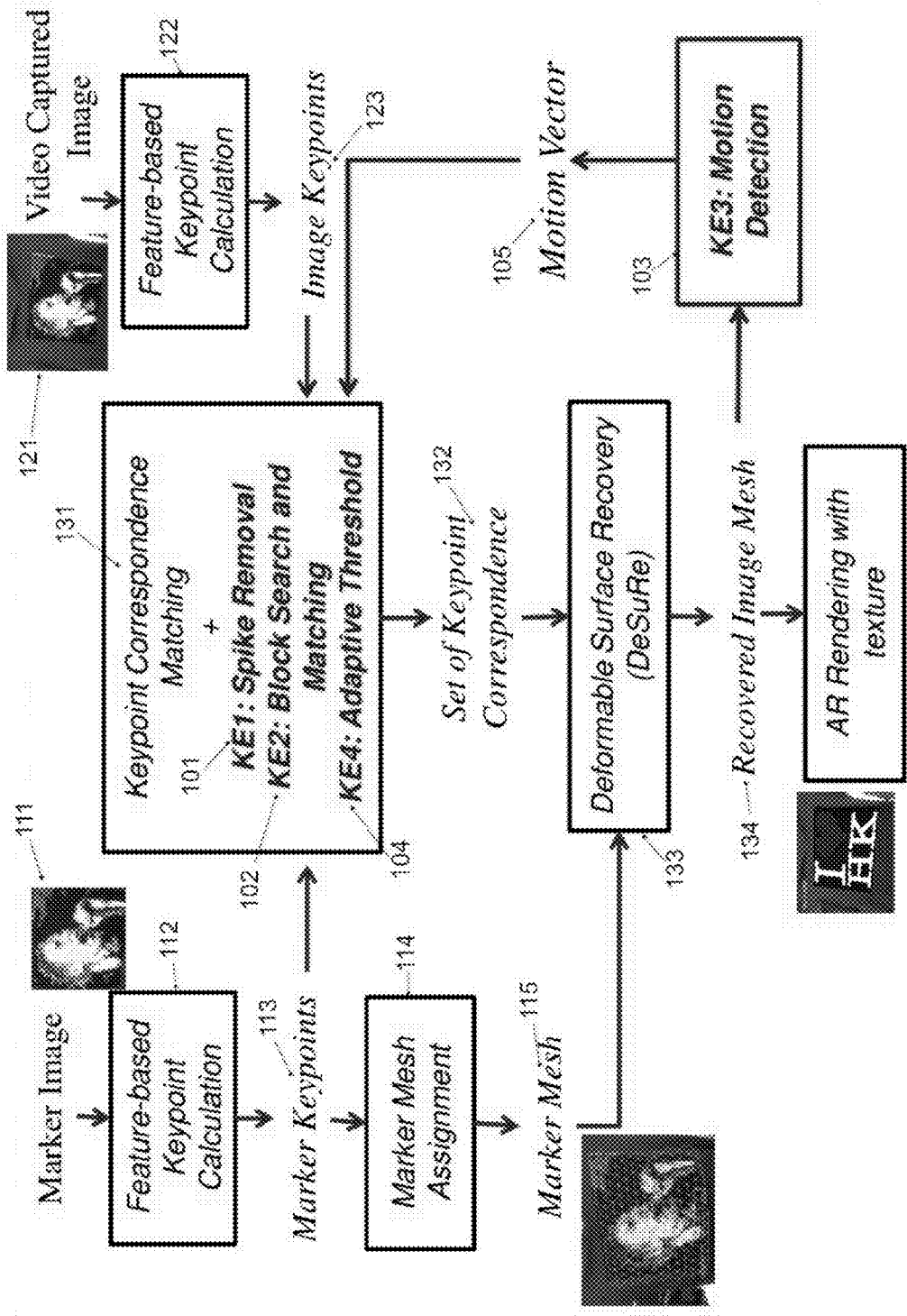
FIG. 1 shows an operation flow diagram of a method of tracking markers on deformable surface used in augmented reality (AR) application in accordance with one embodiment of the presently claimed invention.

Referring to FIG. 1. In accordance to various embodiments of the presently claimed invention, to track a marker placed on a deformable surface, polygon meshes are generated for the marker in a video-captured scene. The polygon meshes are for tracking the markers' three-dimensional positions, two-dimensional orientations, and three-dimensional deformations throughout the motion sequence (or video frames) of the video-captured scene.

In the generation of the polygon meshes of the marker in the video-captured scene, original key-points (referred to as model-key-points hereinafter) (113) of the marker image (111), which can be an original image of the marker are first identified. A key-point can be a sharp pictorial feature such as a corner, an edge, or an interest point of an object in the marker image. In various embodiments, model-key-points are detected using existing edge/corner/interest point detection or feature detection techniques in the art (112). Then in each of the subsequent video frames of the video-captured scene, the same key-points are to be searched and matched with the model-key-points in a key-point-correspondence matching process (131).

In the key-point-correspondence matching process (131), key-point matching scores are calculated, indicating how closely matched of the candidate key-points (referred to as image-key-points hereinafter) (123) found in the subsequent video frames to the model-key-points. A match is considered successful only if the matching score of an image-key-point found in a currently processed video frame (121) is above a pre-determined matching threshold. Finally, information of the successfully matched image-key-points (also referred to as key-point correspondence) (132) in the currently processed video frame and the original marker polygon mesh (115) of the original image of the marker or the image of the marker in the first video frame are used to generate the recovered polygon mesh (134) of the marker in the currently processed video frame. As such, the recovered polygon mesh (134) reflects the changes in the three-dimensional position and orientation, and three-dimensional deformation of the marker in the currently processed video frame from the previous video frame in the video-captured scene. A marker placed on a deformable surface, therefore, is tracked by a series of recovered polygon meshes generated for a series of video frames.

Still referring to FIG. 1. In accordance to one embodiment of the presently claimed invention, the aforementioned generation of the polygon meshes for the marker is enhanced in terms of key-point matching accuracy and marker tracking stability by incorporating an application of a key-point matching score filter (also referred to as spike removal) (101); a restriction on image-key-point searches in the currently processed video frame to within the same mesh block as in the previously processed video frame (also referred to as block search and matching) (102); an application of an adaptive threshold (104) in determining successful matches of image-key-points; and a motion detection (103) of the marker in video-captured scene.

Figure 2:
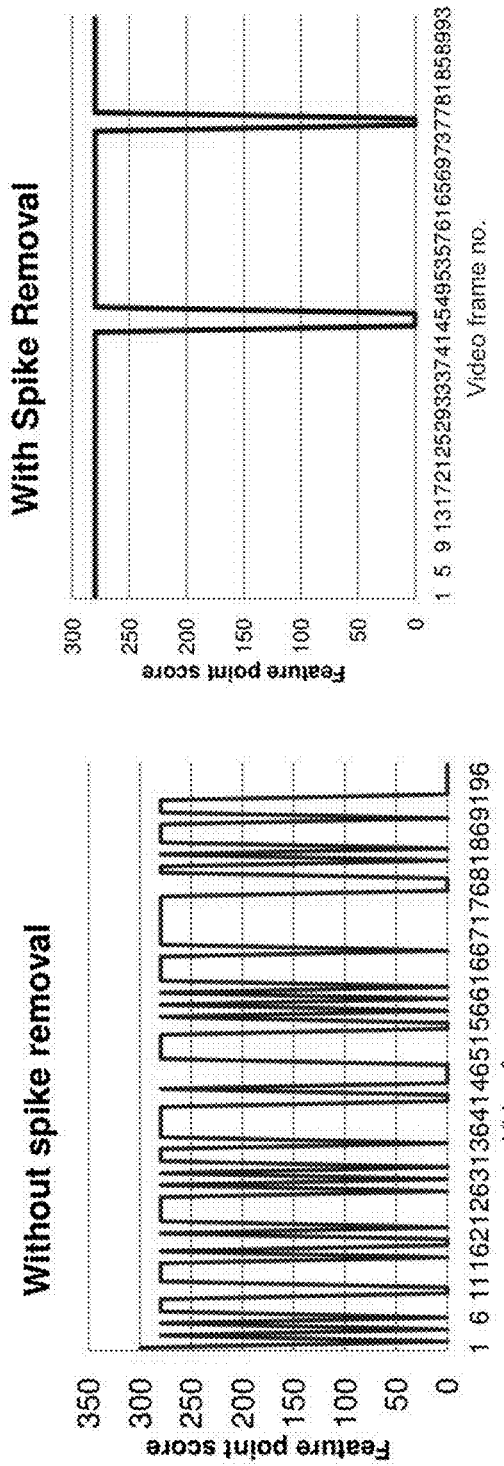
FIG. 2 shows a chart of exemplary inter-frame key-point matching scores and another chart of the same inter-frame key-point matching scores after the application of a key-point matching score filter in accordance to one embodiment of the presently claimed invention.

The application of a key-point matching score filter (101) is to reduce video-noise induced jitters in key-point matching score calculation. When the key-point matching scores of a particular image-key-point are calculated for across multiple video frames, occasionally sharp negative spikes are found. FIG. 2 shows on the left half a chart of exemplary inter-frame key-point matching scores for multiple video frames, which exhibits sharp negative spikes. Experiments reveal that these negative spikes in the inter-frame key-point matching scores are likely caused by video noise rather than actual mismatching or poor matching of candidate key-points. A key-point matching score filter is applied to smoothen the inter-frame key-point matching scores. In one embodiment, the negative spikes are replaced by a weighted average or a moving average of inter-frame key-point matching scores. In another embodiment, the negative spikes are replaced by their preceding scores. FIG. 2 shows on the right half a chart of the same inter-frame key-point matching scores after the application of the key-point matching score filter.

Figure 3:
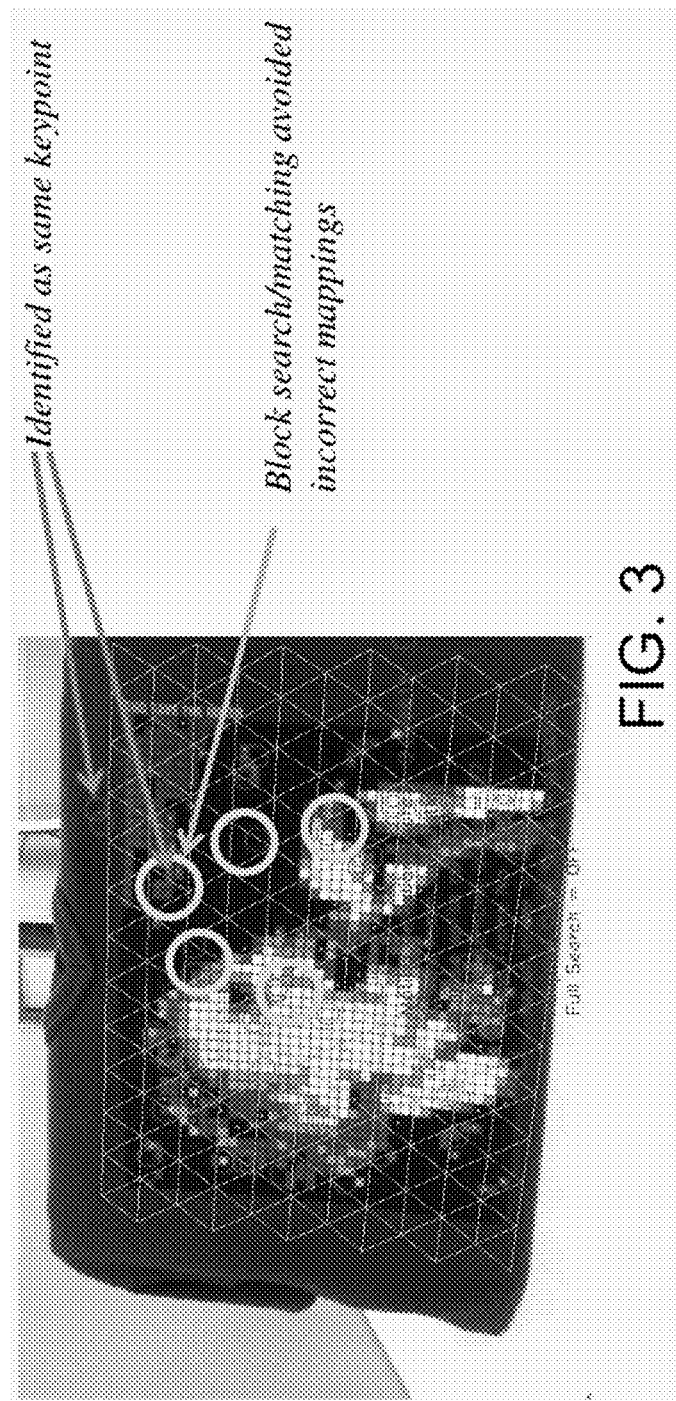
FIG. 3 shows an exemplary mesh block of a marker in one video frame where key-points are found inside and outside of the mesh block.

The block of pixels in the video frame where the recovered polygon mesh is located is called the mesh block. Sometimes, image-key-points are found outside of the mesh block due to video noise or other video effects, which cannot possibly be valid image-key-points of the marker. FIG. 3 shows an exemplary mesh block of a marker in one video frame where image-key-points are found inside and outside of the mesh block. The mesh block key-point search restriction on image-key-point searches is to limit key-point searching and matching in the currently processed video frame to within the same mesh block as in the previously processed video frame. As such, performance and accuracy are improved.

Figure 4:
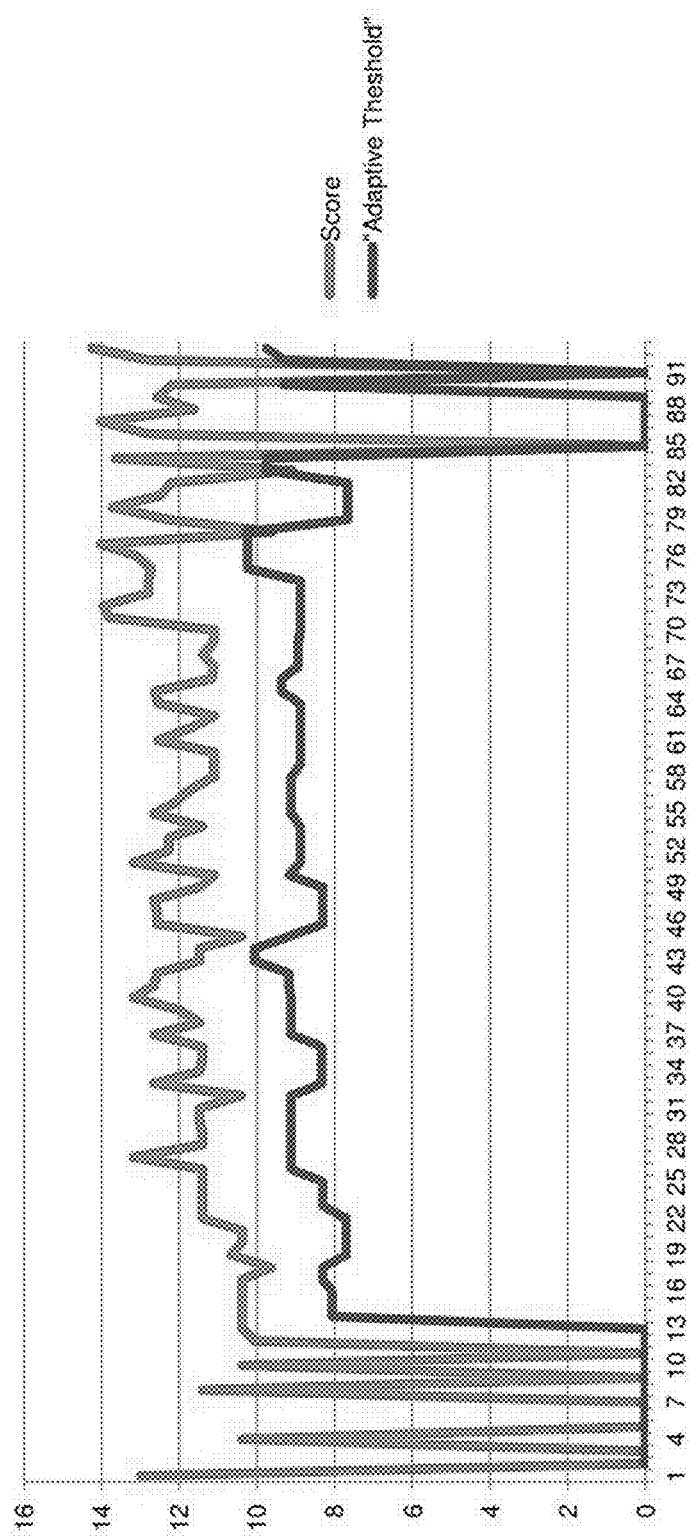
FIG. 4 shows a chart of exemplary inter-frame key-point matching scores and an adaptive threshold in accordance to one embodiment of the presently claimed invention.

Fluctuation in background lighting and video noise throughout the motion sequence of the video-captured scene can cause pixel characteristics, such as color and intensity gradient, to change from one video frame to another. In turn the same image-key-point that is found and correctly matched in different video frames with different background lighting and/or video noise can have significantly different key-point matching scores for the different video frames. A fixed threshold used in determining successful matches for all video frames will inevitably cause incorrect determination of failed matches of valid image-key-points. Thus, one embodiment of the presently claimed invention uses an adaptive threshold in determining successful matches of found key-points throughout the video frames to accommodate the changing background lighting and/or video noise. In one embodiment, the adaptive threshold is a discounted moving average of the inter-frame key-point matching scores or a moving average of inter-frame key-point matching scores less a buffer value. FIG. 4 shows a chart of exemplary inter-frame key-point matching scores and an adaptive threshold.

As the marker's position changes through a motion sequence, the mesh block key-point search restriction could cause missed finding valid image-key-points that are located outside of the mesh block in the currently processed video frame when the marker has moved substantially from the previously processed video frame. At the same time, the key-point matching score calculation must also be more sensitive to found image-key-points that do not match with the model-key-points. Therefore, when the marker is moving substantially, the mesh block key-point search restriction is suspended temporarily and the application of key-point matching score filter is also halted temporarily.

In one embodiment, motion vectors are computed by using vertices of the recovered polygon mesh from the previously processed video frame and vertices of the recovered polygon mesh from the currently processed video frame. If the motion vectors are greater than a pre-determined marker movement threshold, the mesh block key-point search restriction is suspended and the application of key-point matching score filter is also halted for the next video frame to be processed until the motion vectors, that are continuously being computed, are no longer greater than the pre-determined marker movement threshold. This way the texture stickiness of the marker is reduced substantially.

In accordance to various embodiments of the presently claimed invention, the key-point-correspondence matching process can be enhanced by all or any combination of the abovementioned process modules of application of key-point matching score filter; restriction on image-key-point searches in the currently processed video frame to within the same mesh block as in the previously processed video frame; application of adaptive threshold in determining successful matches of image-key-points; and motion detection of the marker in video-captured scene being executed concurrently and in serial manner.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer implemented method for tracking a marker on a deformable surface in augmented reality (AR) applications, comprising:

detecting one or more image-key-points in a currently processed video frame of a video-captured scene, wherein the video-captured scene comprises one or more video frames;
performing key-point-correspondence matching the image-key-points comprising:
  searching for one or more of the image-key-points in the currently processed video frame of the captured video frames that correspond to one or more model-key-points, wherein the one or more model-key-points are identified from an original image of the marker;
  calculating a key-point matching score for each of the image-key-points;
  applying a key-point matching score filter on the key-point matching scores;
  restricting the searching of the one or more of the image-key-points in the currently processed video frame to within same mesh block determined in a previously processed video frame of the captured video frames; and
  applying an adaptive threshold on the key-point matching score for each of the image-key-points in determining successful matches of the image-key-points;
generating a recovered polygon mesh of the marker in the currently processed video frame using information of the successfully matched image-key-points and an original marker polygon mesh of the marker; and
repeating the above steps for generating a series of recovered polygon meshes of the marker for tracking of the marker;
wherein the adaptive threshold for the image-key-point is a discounted moving average of the key-point matching scores of the image-key-point calculated in two or more previously processed video frames.

2. The method of claim 1, further comprising:
performing motion detection of the marker in the video-captured scene comprising:
  computing one or more motion vectors using the recovered image mesh of the marker in the currently processed video frame of the captured video frames and the recovered image mesh of the marker in the previously processed video frame;
  comparing the computed motion vectors to a movement threshold; and
  if the computed motion vectors are greater than the movement threshold, the application of the key-point matching score filter is halted and the restriction on the image-key-point searching is suspended until the computed motion vectors is not greater than the movement threshold.

3. The method of claim 1, wherein the key-point matching score filter replaces a negative spike of the key-point matching score of an image-key-point by a weighted average of two or more key-point matching scores of the image-key-point calculated in two or more previously processed video frames.

4. The method of claim 1, wherein the key-point matching score filter replaces a negative spike of the key-point matching score of an image-key-point by the key-point matching score of the image-key-point calculated in the previously processed video frame.

5. A computer implemented method for tracking a marker on a deformable surface in augmented reality (AR) applications, comprising:

detecting one or more image-key-points in a currently processed video frame of a video-captured scene, wherein the video-captured scene comprises one or more video frames;
performing key-point-correspondence matching the image-key-points comprising:
  searching for one or more of the image-key-points in the currently processed video frame of the captured video frames that correspond to one or more model-key-points, wherein the one or more model-key-points are identified from an original image of the marker;
  calculating a key-point matching score for each of the image-key-points;
  applying a key-point matching score filter on the key-point matching scores;
  restricting the searching of the one or more of the image-key-points in the currently processed video frame to within same mesh block determined in a previously processed video frame of the captured video frames; and
  applying an adaptive threshold on the key-point matching score for each of the image-key-points in determining successful matches of the image-key-points;
generating a recovered polygon mesh of the marker in the currently processed video frame using information of the successfully matched image-key-points and an original marker polygon mesh of the marker; and
repeating the above steps for generating a series of recovered polygon meshes of the marker for tracking of the marker;
wherein the adaptive threshold for the image-key-point is a moving average of the key-point matching scores of the image-key-point calculated in two or more previously processed video frames less a buffer value.

6. The method of claim 5, further comprising:
performing motion detection of the marker in the video-captured scene comprising:
  computing one or more motion vectors using the recovered image mesh of the marker in the currently processed video frame of the captured video frames and the recovered image mesh of the marker in the previously processed video frame;
  comparing the computed motion vectors to a movement threshold; and
  if the computed motion vectors are greater than the movement threshold, the application of the key-point matching score filter is halted and the restriction on the image-key-point searching is suspended until the computed motion vectors is not greater than the movement threshold.

7. The method of claim 5, wherein the key-point matching score filter replaces a negative spike of the key-point matching score of an image-key-point by a weighted average of two or more key-point matching scores of the image-key-point calculated in two or more previously processed video frames.

8. The method of claim 5, wherein the key-point matching score filter replaces a negative spike of the key-point matching score of an image-key-point by the key-point matching score of the image-key-point calculated in the previously processed video frame.

* * * * *